(12) United States Patent
Brell et al.

(10) Patent No.: US 6,588,712 B2
(45) Date of Patent: Jul. 8, 2003

(54) CLAMP FOR A CYLINDRICAL ELEMENT SUCH AS AN ELECTRIC CABLE, TUBE OR HOSE, AND ASSEMBLY KIT FOR MAKING A SERIES OF INTERCONNECTED CLAMPS

(75) Inventors: Klaus-Erich Brell, Hagen (DE); Klaus-Dieter Gabriel, Hagen (DE); Albert Hitzler, Gundelsingen (DE); Sven Müller, Breckerfeld (DE)

(73) Assignee: Demag Cranes & Components GmbH, Wetter (DE)

(*) Notice: Subject to any disclaimer, the term of this patent is extended or adjusted under 35 U.S.C. 154(b) by 0 days.

(21) Appl. No.: 10/187,866

(22) Filed: Jul. 2, 2002

(65) Prior Publication Data
US 2003/0015629 A1 Jan. 23, 2003

(30) Foreign Application Priority Data
Jul. 18, 2001 (DE) .......................... 101 35 033

(51) Int. Cl.[7] .................................................. F16L 3/11
(52) U.S. Cl. ............................ 248/58; 248/63; 248/65; 403/96; 74/502.6
(58) Field of Search ............................. 248/58, 63, 65, 248/74.1, 74.4, 292.12; 24/514, 569; 74/502.4, 502.6; 403/84, 91, 93, 97, 96

(56) References Cited

U.S. PATENT DOCUMENTS

| | | | | |
|---|---|---|---|---|
| 1,835,473 A | * | 12/1931 | Davidson | |
| 2,390,192 A | * | 12/1945 | St. Clair | 248/63 |
| 3,126,191 A | * | 3/1964 | Holden | 248/286 |
| 3,495,857 A | * | 2/1970 | Hawke et al. | 287/54 |
| 3,664,620 A | * | 5/1972 | Branum | 248/63 |
| 3,706,436 A | * | 12/1972 | Lindsey | 248/63 |
| 4,895,338 A | * | 1/1990 | Froutzis | 248/503.1 |
| 5,017,038 A | * | 5/1991 | Kurosaki | 403/385 |
| 5,167,466 A | * | 12/1992 | Hsieh | 403/385 |
| 5,645,255 A | * | 7/1997 | Parduhn | 248/214 |
| 5,794,897 A | * | 8/1998 | Jobin et al. | 248/74.4 |

FOREIGN PATENT DOCUMENTS

| | | |
|---|---|---|
| DE | 18 32 077 U | 5/1961 |
| DE | 92 13 837 U1 | 1/1993 |
| DE | 691 03 678 T2 | 4/1995 |
| DE | 195 09 997 A1 | 9/1996 |
| DE | 296 15 463 U1 | 4/1997 |

* cited by examiner

Primary Examiner—Anita King
Assistant Examiner—Steven Marsh
(74) Attorney, Agent, or Firm—Henry M. Feiereisen

(57) ABSTRACT

A clamp for a cylindrical includes a base portion and a clamping portion which define together a common through opening for passage of a cylindrical element. Fasteners are provided to brace the base portion and the clamping portion to thereby hold the cylindrical element in a clamping zone. The base portion and the clamping portion are each provided with an attachment surface, wherein the attachment surface of the clamping portion includes a cutout formed with internal teeth for optional positive engagement of external circumferential teeth of a protrusion of a base portion of a further such base portion or external circumferential teeth of a protrusion of a connection piece, such that the internal and external teeth are constrained against rotation. Thus, a series of clamps can be stacked on top of one another.

14 Claims, 5 Drawing Sheets

CLAMP FOR A CYLINDRICAL ELEMENT SUCH AS AN ELECTRIC CABLE, TUBE OR HOSE, AND ASSEMBLY KIT FOR MAKING A SERIES OF INTERCONNECTED CLAMPS

CROSS-REFERENCES TO RELATED APPLICATIONS

This application claims the priority of German Patent Application Serial No. 101 35 033.3, filed Jul. 18, 2001, pursuant to 35 U.S.C. 119(a)–(d), the subject matter of which is incorporated herein by reference.

BACKGROUND OF THE INVENTION

The present invention relates to a clamp for a cylindrical element, such as an electric cable, tube or hose. The present invention also relates to an assembly kit for making a series of interconnected clamps.

German patent document DE 195 09 997 A1, published Sep. 26, 1996, describes a clamp for a cable, having a base portion and a clamping portion, each including two peripheral flanges. Both, base portion and clamping portion, are arranged in spaced-apart confronting relationship to provide a common through opening for holding the cable. The peripheral flanges are formed with bores for bolting the base portion and the clamping portion together by respective screws inserted through the bores. In this way, the base portion and the clamping portion are mutually braced via the cable. The base portion is provided with a fastening element for attachment of the clamp.

German utility model DE 296 15 463 U1, published Apr. 30, 1997, describes a hose clamp, which can be adjusted in different directions and includes a retention member swingably received in the clamp and intended for passage of a hose.

Conventional clamps suffer shortcomings in conjunction with attaining a simple and stable connection to an attachment surface, especially planar attachment surface.

It would therefore be desirable and advantageous to provide an improved clamp which obviates prior art shortcomings and which can be mounted to an attachment surface of an attachment member in a stable and secure manner.

SUMMARY OF THE INVENTION

According to one aspect of the present invention, a clamp for a cylindrical element, in particular an electric cable, tube or hose, includes a base portion having an inner side in the form of a trough-like concave first indentation and an outer side provided with a first attachment surface, a clamping portion having an inner side in the form of a trough-like concave second indentation in spaced apart confronting relationship to the first indentation to thereby define a common through opening for passage of a cylindrical element, and an outer side provided with a second attachment surface, wherein the first and second attachment surfaces are configured for force-fitting engagement with a complementary attachment surface, wherein the second attachment surface includes cutout formed with internal teeth for optional positive engagement of external circumferential teeth of a protrusion of a base portion of a further such base portion or external circumferential teeth of a protrusion of a connection piece, such that the internal and external teeth are constrained against rotation; and fasteners for interconnecting the base portion to the clamping portion via the cylindrical element to thereby hold the cylindrical element in a clamping zone.

As the internal and external teeth are constrained against rotation, an assembly in form of a stack of superimposed clamps can be realized in a simple and effective manner whereby a clamping portion of one clamp can be directly connected to a base portion of another superimposed clamp.

Suitably, the complementary attachment surface is formed on an outer side of the connection piece and the protrusion is formed on an inner side of the connection piece.

According to another feature of the present invention, the first and second indentations define a longitudinal axis and are arranged in symmetric relationship with respect to a center plane in which the longitudinal axis extends.

In order to realize a placement of two cylindrical elements of different diameters, the first and second indentations may each be comprised of two part-cylindrical concave inner surfaces. Cylindrical elements of any diameter can be received when the first and second indentations are each comprised of two halves having curved inner surfaces defined by a radius of curvature which decreases from inside to the outside.

According to another feature of the present invention, the first indentation defines a longitudinal axis and together with the longitudinal axis may be curved convexly to the outside. In this way, a better guidance of the cylindrical element is attained.

According to yet another feature of the present invention, the first and second attachment surfaces and the complementary attachment surface of the connection piece are planar.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
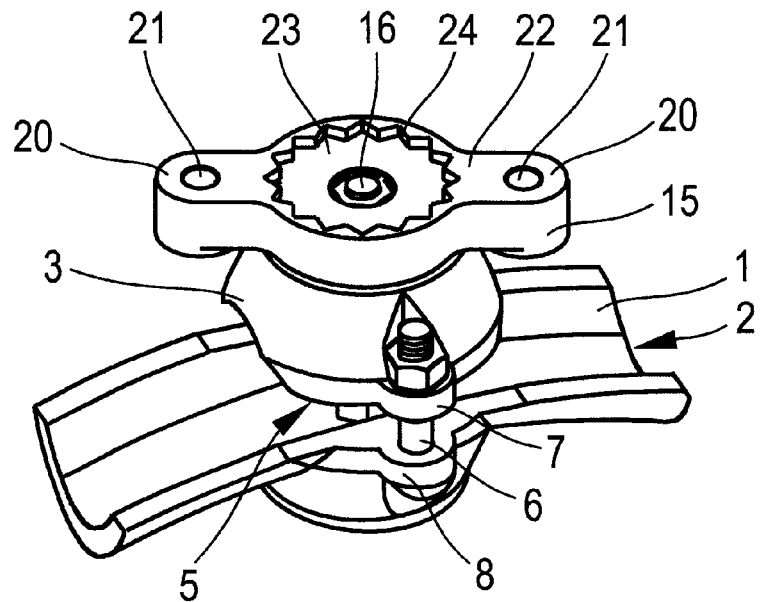
FIG. 1 is a perspective illustration of a clamp according to the present invention in assembled state.

Throughout all the Figures, same or corresponding elements are generally indicated by same reference numerals.

Turning now to the drawing, and in particular to FIG. 1, there is shown a perspective illustration of a clamp according to the present invention in assembled state. The clamp includes a base portion 1 which is formed with an elongate indentation 2 to form a trough. Confronting the base portion 1 is a clamping portion 3, which is formed with an indentation 4, as shown in FIG. 3. In the assembled state of the clamp, as shown in FIG. 1, the concave indentations 2, 4 confront one another to define a common through opening 5 for receiving a cylindrical element (not shown), such as an electric cable, tube or hose or the like.

Figure 3B:
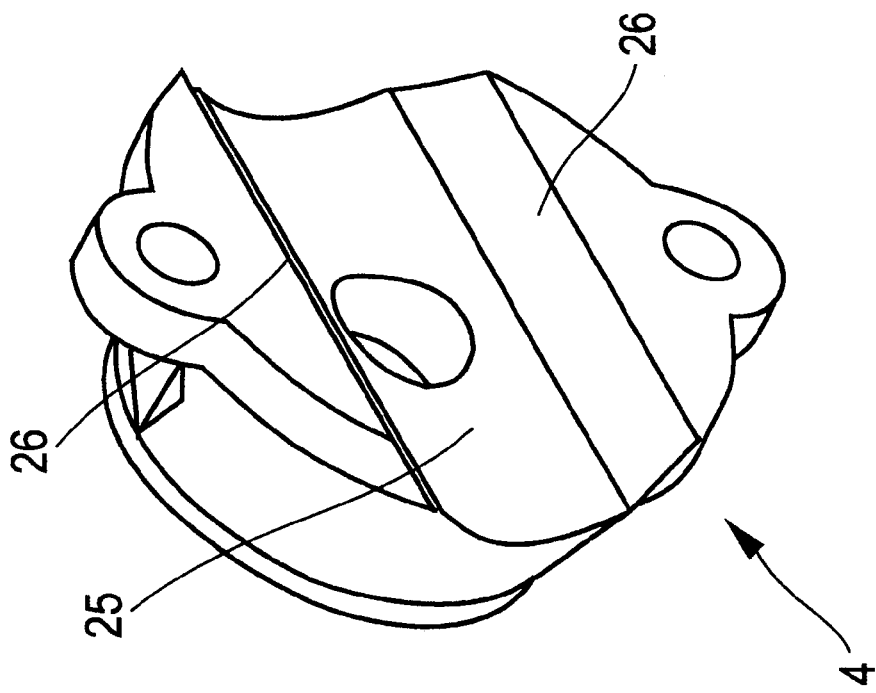
FIG. 3b is a bottom perspective view of the clamping portion of the clamp.
Figure 3A:
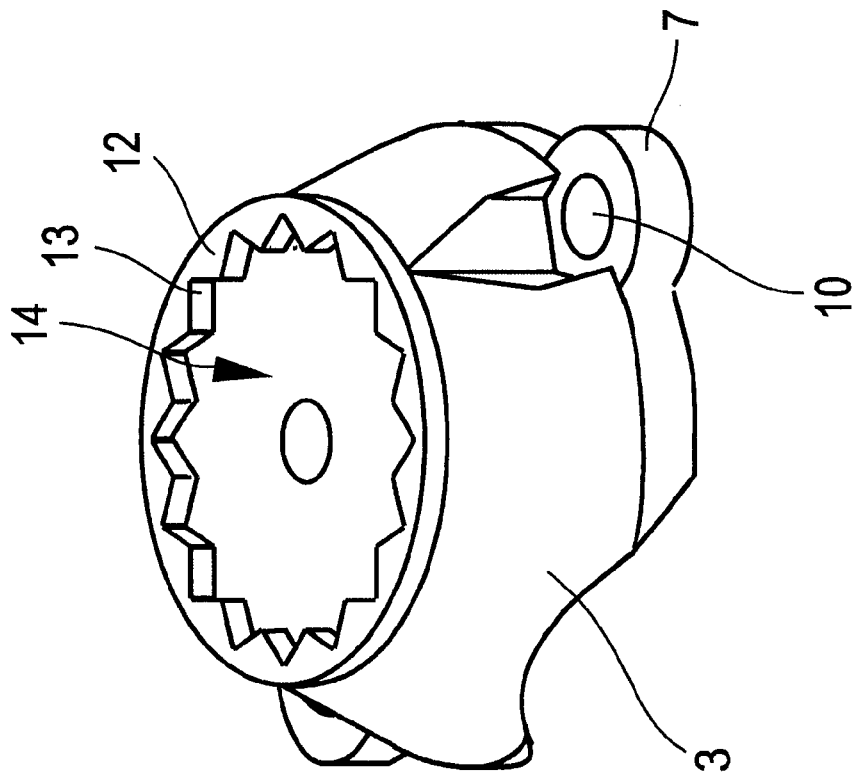
FIG. 3a is a top perspective view of a clamping portion of the clamp.
Figure 4B:
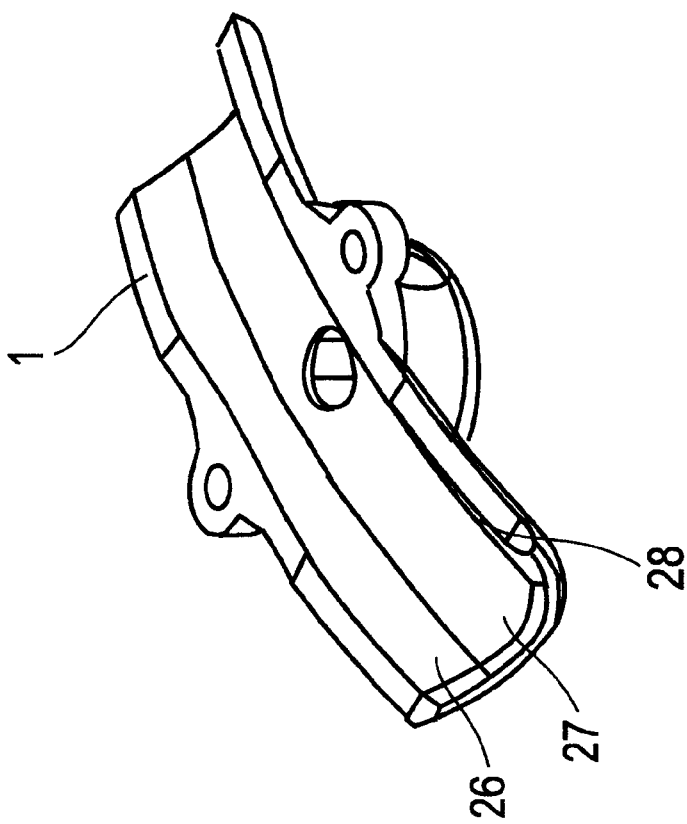
FIG. 4b is a top perspective view of the base portion of the clamp.
Figure 4A:
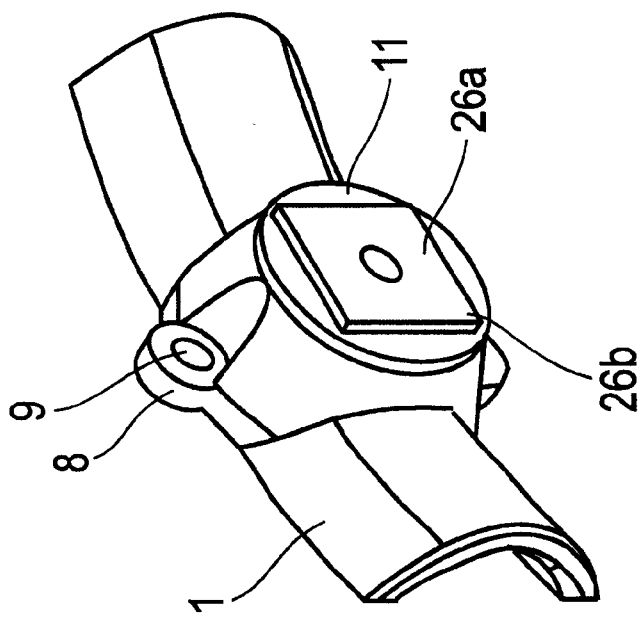
FIG. 4a is a bottom perspective view of a base portion of the clamp.

The base portion 1 and the clamping portion 3 are arranged in spaced-apart relationship and are mutually braced by bolts 6 via the cylindrical element, so that the clamp in the clamped length zone holds the cylindrical element. The bolts 6 are received in aligned throughbores 9, 10 of the base portion 1 and the clamping portion 3, respectively. As shown in FIGS. 3a, 3b, the throughbores 10 are formed in peripheral flanges 7 of the clamping portion 3 whereas the base portion 1 is provided with peripheral flanges 8 in which the throughbores 9 are formed, as shown in FIGS. 4a, 4b. Thus, the bolts 6 assume the function of a bracing member. For realizing a clamping of the cylindrical element, the base portion 1 and the clamping portion 3 maintain a certain distance, even when the cylindrical element is passed through.

In order to enable a forced connection of the base portion 1 or the clamping portion 3 against an attachment surface of an attachment member, the base portion 1 and the clamping portion 3 are each provided in the assembled state with a planar attachment surface 11, 12 on their respective outer side so that the attachment surfaces 11, 12 face away from one another. Of course, the planar configuration of the attachment surfaces 11, 12 should only be considered an exemplary configuration, as the attachment surfaces 11, 12 may have any desired shape. However, in the latter case, the attachment surfaces have to complement one another.

Figure 2:
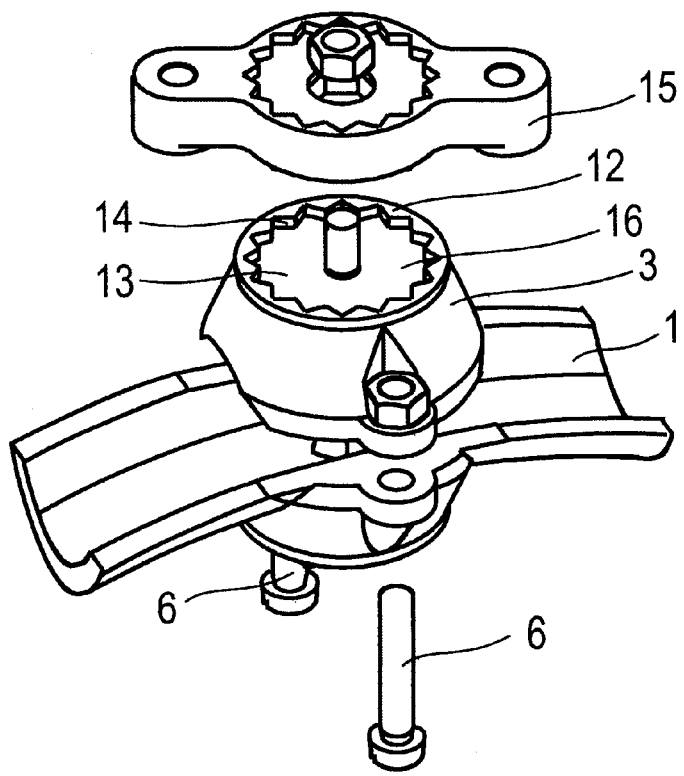
FIG. 2 is an explosive illustration of the clamp.

As shown in FIGS. 2 and 3a, the attachment surface 12 of the clamping portion 3 is formed with a cutout 13, which has internal teeth 14 about its inner circumference. In the embodiment shown in FIGS. 1 and 2, the clamp further includes a connection piece 15 which can be secured to the clamping portion 3 by means of a bolt 16. As shown in FIG. 5a, the connection piece 15 has an attachment surface 17, which bears against the attachment surface 12 of the clamping portion 3, when the clamp is assembled. The connection piece 15 has flanged ends 20 which are formed with throughbores 21 for securement of the connection piece 15 to, for example, a trolley, whereby the connection piece 15 is hereby provided with an outwardly directed attachment surface 22, as shown in FIG. 5b.

As best seen in FIG. 5a, the connection piece 15 is provided with a protrusion 18 which projects out from the attachment surface 17 and has a generally square configuration with four corners 19. The protrusion 18 is so dimensioned as to be insertable in the cutout 13 of the clamping portion 3, whereby the corners 19 engage the internal teeth 14 like teeth to establish a positive connection that prevents a rotation of both base portion 1 and clamping portion 3 relative to one another.

Figure 5B:
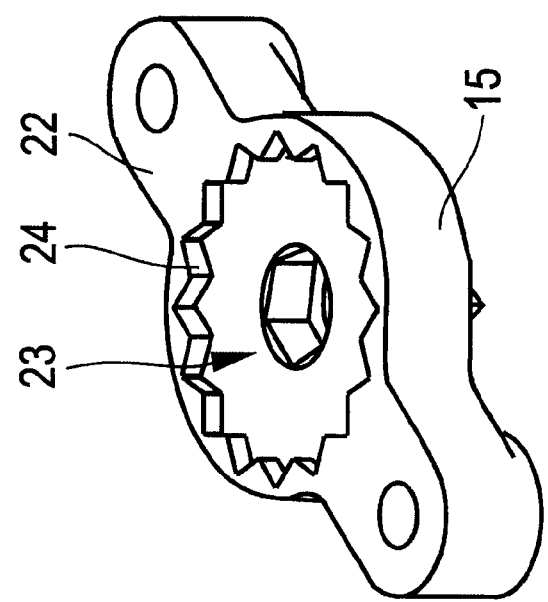
FIG. 5b is a top perspective view of the connection piece.
Figure 5A:
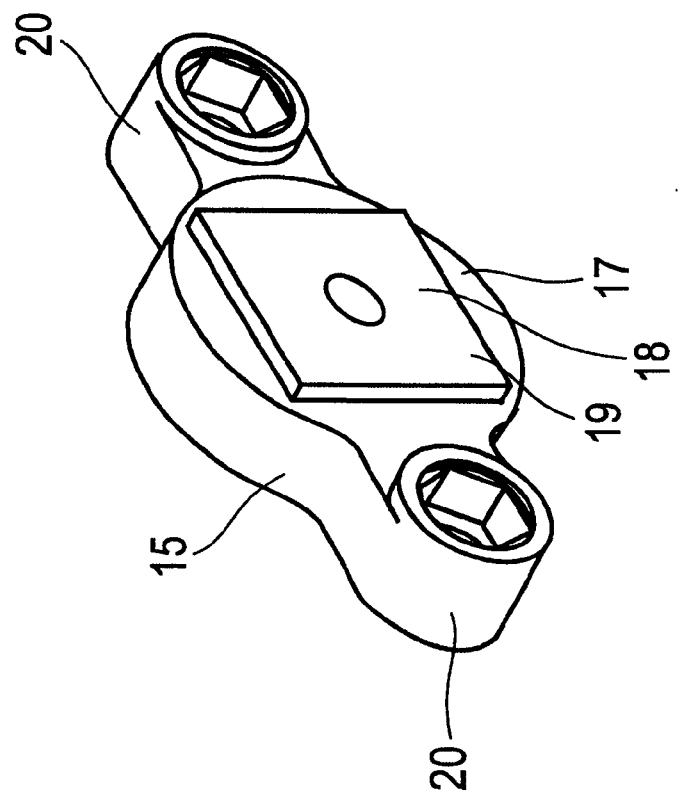
FIG. 5a is a bottom perspective view of a connection piece for optional attachment to the clamp.

As further shown in FIGS. 1 and 5b, also the attachment surface 22 of the connection piece has a cutout 23 formed with internal teeth 24 and substantially corresponding to the dimension of the cutout 13 and the internal teeth 14 so as to allow insertion of a base portion 1 of another clamp, when a base portion 1 of an addition clamp should be attached, if desired.

Referring now in particular to FIGS. 3a and 3b, it can be seen that the indentation 4 of the clamping portion 3 of the clamp extends symmetric to the center plane and is comprised of two part-cylindrical concave inner surfaces 25, 26. Both inner surfaces 25, 26 have each a radius of curvature and thus are intended for use with cylindrical elements with respective diameter. The indentation 4 is thus dimensioned for two different diameters. Of course, the inner surfaces 25, 26 may also be formed of two halves having inner surfaces with such a curvature so that the radius of curvature decreases from inside to the outside. Thus, the cross section may have, for example, a parabola.

As shown in FIGS. 4a and 4b, the base portion 1 of the clamp has a protrusion 26a projecting out form the attachment surface 11 and having a square configuration with four corners 26b. The protrusion 26a is so sized as to be insertable in the cutout 13 of the clamping portion 3, whereby the corners 26b engage like teeth in the internal teeth 14 of the clamping portion. The thusformed positive engagement restrains the base portion 1 and the clamping portion 3 against rotation. The indentation 2 of the base portion 1 is comprised, analogous to the clamping portion 3, of two part-cylindrical inner surfaces 27, 28 having a radius of curvature which corresponds to the radius of curvature of the inner surfaces 25, 26. Also the indentation may have as cross section a parabola.

Figure 6:
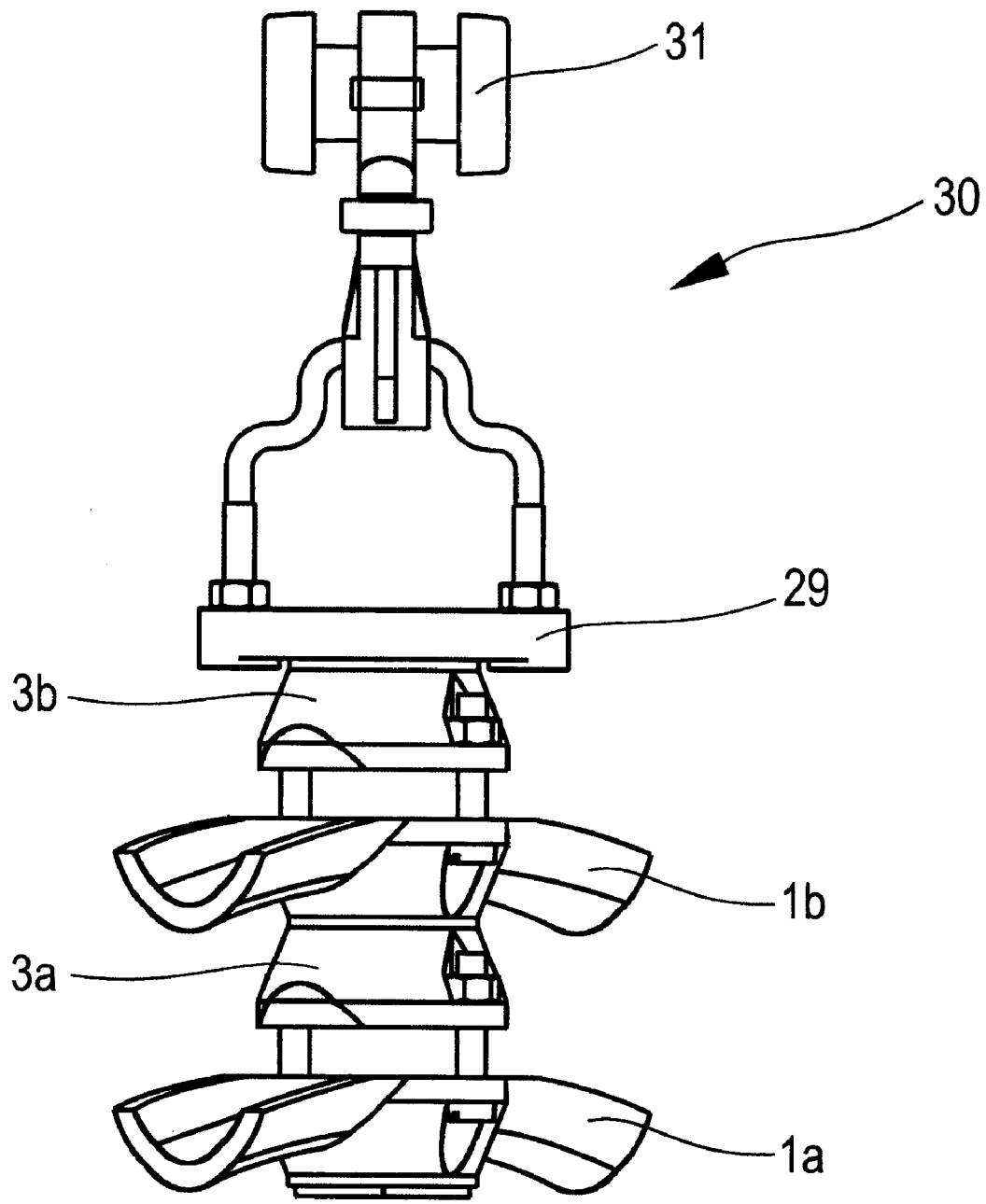
FIG. 6 is an illustration of two clamps in interconnected superimposed disposition for attachment to a trolley.

FIG. 6 shows an exemplified assembly of two interconnected clamps. In the following description, parts corresponding with those in FIG. 1 will be identified by corresponding reference numerals followed by an "a" for one clamp and followed by a "b" for the other clamp. The lower clamp includes the braced base portion 1a and clamping portion 3a, whereby the clamping portion 3a of the lower clamp is connected to the base portion 1b of the upper clamp through positive engagement of the corners 26a of the protrusion 26b with the internal teeth 14 of the cutout 13 of the clamping portion 3a. Thus, the clamps are interconnected in immediate superimposed relationship. In the non-limiting example of FIG. 6, the clamping portion 3b of the upper clamp is bolted to a carrier 29 of a trolley with running wheels 31.

While the invention has been illustrated and described as embodied in a clamp for a cylindrical element such as an electric cable, tube or hose, and assembly kit for making a series of interconnected clamps, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A clamp for a cylindrical element, in particular an electric cable, tube or hose, comprising:

a base portion having an inner side in the form of a trough-like concave first indentation and an outer side provided with a first attachment surface;

a clamping portion having an inner side in the form of a trough-like concave second indentation in spaced apart confronting relationship to the first indentation to thereby define a common through opening for passage of a cylindrical element, and an outer side provided with a second attachment surface, wherein the first and second attachment surfaces are configured for force-fitting engagement with a complementary attachment surface, wherein the second attachment surface includes a cutout formed with internal teeth for optional positive engagement of external circumferential teeth of a protrusion of a base portion of a further said base portion or external circumferential teeth of a protrusion of a connection piece, such that the internal and external teeth are constrained against rotation; and fastening means for interconnecting the base portion to the clamping portion via the cylindrical element to thereby hold the cylindrical element in a clamping zone.

2. The clamp of claim 1, wherein the complementary attachment surface is formed on an outer side of the connection piece and the protrusion is formed on an inner side of the connection piece.

3. The clamp of claim 1, wherein the first and second indentations define a longitudinal axis and are arranged in symmetric relationship with respect to a center plane in which the longitudinal axis extends.

4. The clamp of claim 1, wherein the first and second indentations are each comprised of two part-cylindrical inner surfaces.

5. The clamp of claim 1, wherein the first and second indentations are each comprised of two halves having curved inner surfaces defined by a radius of curvature which decreases from inside to the outside.

6. The clamp of claim 1, wherein the first indentation defines a longitudinal axis and together with the longitudinal axis is curved convexly to the outside.

7. The clamp of claim 1, wherein the first and second attachment surfaces and the complementary attachment surface are planar.

8. A clamp, comprising:

a base portion having a trough on one side and a protrusion on an opposite side;

a clamping portion configured for attachment to the base portion and having a trough on one side in spaced apart confronting relationship to the trough of the base portion to thereby define a common through opening for passage of a cylindrical element, and a cutout on an opposite side for positive engagement of a protrusion of a further such base portion to prevent a relative rotation between the further such base portion and the clamping portion; and fastening means for bracing the base portion and the clamping portion to thereby hold the cylindrical element in place.

9. The clamp of claim 8, wherein the cutout of the clamping portion has internal teeth for engagement by corners of the protrusion of the base portion.

10. The clamp of claim 8, wherein the trough of the base portion and the trough of the clamping portion are each comprised of two part-cylindrical inner surfaces.

11. The clamp of claim 8, wherein the troughs of the base and clamping portions are each comprised of two halves with curved inner surfaces defined by a radius of curvature which decreases from inside to outside.

12. The clamp of claim 8, wherein the trough of the base portion is curved convexly to the outside.

13. An assembly kit, comprising:

a plurality of base portions, each having a trough on one side and a protrusion on an opposite side;

a plurality of clamping portions, each configured for attachment to the base portions and having a trough on one side in spaced apart confronting relationship to the trough of the base portion to thereby define a common through opening for passage of a cylindrical element, and a cutout on an opposite side;

a connection piece configured for attachment to the clamping portion and having a cutout on one side and a protrusion on an opposite side; and fastening means for bracing the base portions and the clamping portions, wherein the protrusion of the base portion or the protrusion of the connection piece is form-fittingly connectable in fixed rotative engagement to the cutout of the clamping portion.

14. The kit of claim 13, wherein the cutout of the clamping portion and the cutout of the connection piece are each formed with internal teeth for engagement by corners of the protrusion of the base portion or of the connection piece.

* * * * *